J. SENIO.
MILK BOTTLE COVER.
APPLICATION FILED MAY 2, 1921.
1,417,282.
Patented May 23, 1922.
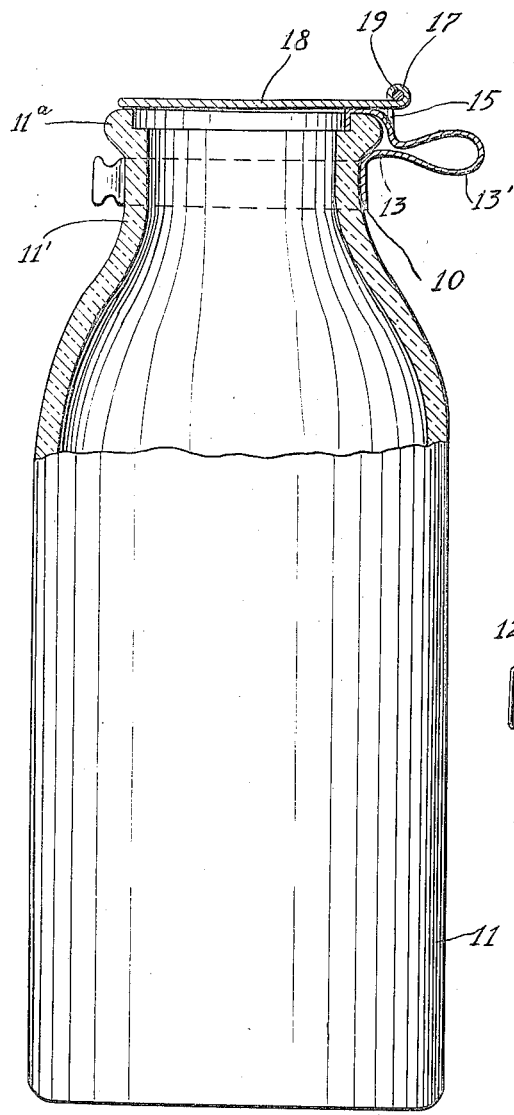
FIG. 1.
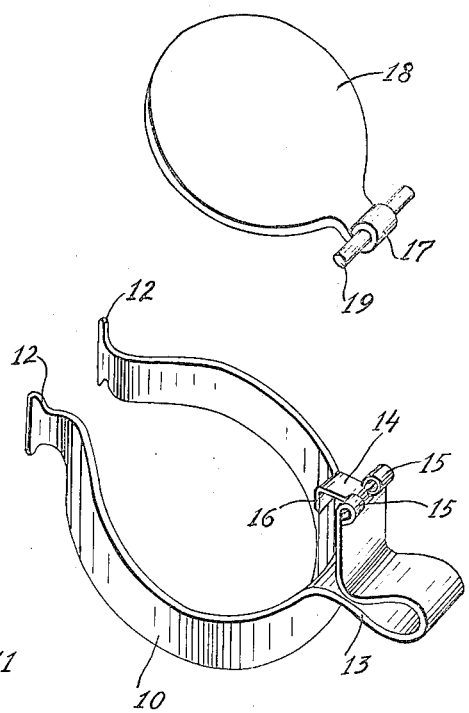
FIG. 3.
FIG. 2.
INVENTOR.
JOHN SENIO.
BY
ATTORNEY.

UNITED STATES PATENT OFFICE.

JOHN SENIO, OF SOUTHINGTON, CONNECTICUT.

MILK-BOTTLE COVER.

1,417,282.　　　　　Specification of Letters Patent.　　Patented May 23, 1922.

Application filed May 2, 1921. Serial No. 466,054.

*To all whom it may concern:*

Be it known that I, JOHN SENIO, a citizen of the United States, residing at Southington, in the county of Hartford and State of Connecticut, have invented certain new and useful Improvements in Milk-Bottle Covers, of which the following is a specification.

This invention relates to a milk bottle cover adapted to be placed on the milk bottle by the user after the usual paper disk is removed.

The invention has for an object to provide a novel and improved type of easily applied and removed milk bottle cover, which comprises a hinged cover element mounted on a novel resilient clip which engages the neck of the bottle.

For further comprehension of the invention, and of the objects and advantages thereof, reference will be had to the followin description and accompanying drawings, and to the appended claims in which the various novel features of the invention are more particularly set forth.

Fig. 1 of the drawings is a part side elevation and part vertical axial section of a milk bottle provided with a cover constructed according to the invention.

Fig. 2 is a detail perspective view of the clip which engages the neck of the bottle, and to which the cover proper, or cover element, is hinged.

Fig. 3 is a detail perspective view of the cover proper.

In constructing my improved milk bottle cover I provide a resilient clip 10 consisting of a flat strip of metal bent to partially enclose the neck 11' of a milk bottle 11 of usual construction, this clip having outwardly bent tips 12.

Midway between the ends of this clip it is formed with an integral tongue 13 projecting at right angles therefrom at the upper side thereof. This tongue is bent first backwardly and then forwardly to form a loop 13' projecting backwardly from the body of the clip and being longitudinally split at its end into centre and side members 14 and 15, the centre member being bent to clip over the lip of the bottle and having at its extreme end a tip 16 which engages in the usual recess provided in the bottle to receive the paper disk.

The side members 15 formed by splitting the end of the tongue are extended vertically upwardly above the central portion and bent to form hinge eyes. These hinge eyes 15 co-operate with a hinge eye 17 formed on one side of a flat disk 18 which forms the cover proper, the hinge eye on the cover being placed between the spaced hinge eyes 15 on the tongue 13, as will be understood, and a hinge pin 19 inserted therethrough.

With the above construction the cover 18 will lie close to the mouth of the bottle, regardless of the thickness of the head 11$^a$ on the neck of the bottle, the resilient loop 13' being arranged to exert a downward pressure on the clip 14 and hinge elements 15.

Having thus described my invention what I claim as new and desire to protect by Letters Patent of the United States is as follows:

1. A milk bottle cover comprising a resilient clip adapted to partially encircle the neck of the bottle, a resilient member projecting from said clip between the ends thereof and having its end adapted to extend over the lip of the bottle and press downwardly by its resiliency thereon, and a cover element hinged to said member.

2. A milk bottle cover comprising a resilient clip adapted to partially encircle the neck of the bottle, a tongue on said clip midway between the ends thereof forming a backwardly projected loop, and a cover element hinged to said tongue, said tongue having its end adapted to extend over the lip of the bottle and press downwardly thereon.

3. A milk bottle cover comprising a resilient clip adapted to partially encircle the neck of the bottle, a tongue on said clip midway between the ends thereof forming a backwardly projected loop, and a cover element hinged to said tongue, said tongue having its end adapted to extend over the lip of the bottle and press downwardly thereon, and presenting a downwardly projected tip adapted to engage in the mouth of the bottle.

4. A milk bottle cover comprising a resilient clip adapted to partially encircle the neck of the bottle, a tongue on said clip midway between the ends thereof forming a backwardly projected loop, and a cover element hinged to said tongue, said tongue having its end longitudinally divided into centre and side members, the centre member being adapted to clip over the lip of the bottle and the side members forming hinge elements to support the said cover.

In testimony whereof I have affixed my signature.

JOHN SENIO.